Feb. 26, 1952  J. HOEKSTRA  2,587,157
ROTATABLE DRUM WITH LIQUID BATH
Filed Feb. 5, 1947

J. HOEKSTRA
INVENTOR
BY
AGENT

Patented Feb. 26, 1952

2,587,157

UNITED STATES PATENT OFFICE 2,587,157

ROTATABLE DRUM WITH LIQUID BATH

Johannes Hoekstra, Eindhoven, Netherlands, assignor to Hartford National Bank and Trust Company, Hartford, Conn., as trustee Application February 5, 1947, Serial No. 726,491
In the Netherlands May 30, 1944

Section 1, Public Law 690, August 8, 1946
Patent expires May 30, 1964

3 Claims. (Cl. 210—180)

This invention relates to a rotatable drum which contains a liquid bath and is used for instance for galvanizing or etching objects, as well as for other chemical or physical treatments such as degreasing, cleaning, derusting or the like of large numbers of comparatively small objects. The liquid used for this purpose may be impaired by anode slime or other impurities, by which the activity of the liquid is reduced. This may be avoided by filtering the liquid.

According to the invention this filtering may take place during operation of the installation, since the rotatable drum comprises a filter which follows the movement of the drum and whose inlet and outlet opening for the liquid are located at two different points of the drum, which are displaced relatively to each other in the direction of rotation of the drum. When, owing to the rotary movement of the drum the opening of this filter, which is lowest at this moment, descends below the surface of the liquid, a part of the liquid contained in the drum flows into this filter. During the descent of the filter owing to the further rotation of the drum, it is steadily filled with liquid. After the filter has reached the lowest point it ascends, the aperture which first entered the liquid also first leaving it. In this way the liquid traverses the filter and leaves it again through the aperture which is now undermost. During every revolution of the drum this filtering of part of the liquid is repeated.

In order that the invention may be more clearly understood and readily carried into effect it will now be described more fully with reference to the accompanying drawing, representing by way of example, two embodiments thereof.

Figure 1:
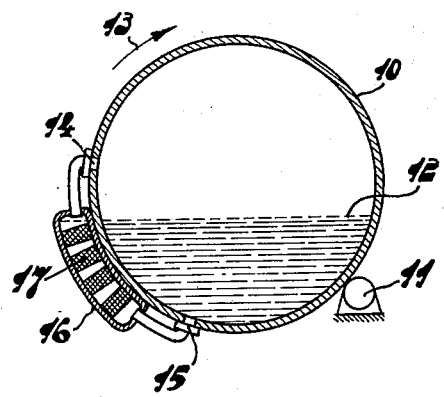
Figure 2:
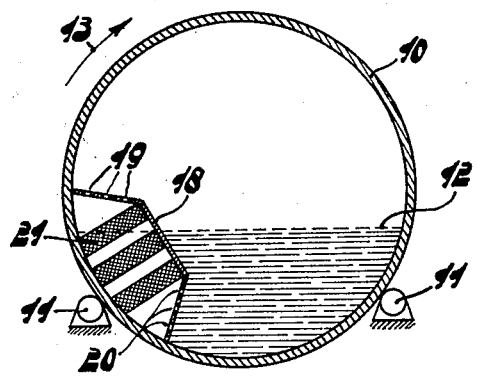

Figs. 1 and 2 are cross-sections of drums with liquid baths, comprising different filters.

In Figure 1 the reference number 10 denotes the cross-section of the wall of a cylindrical, horizontal drum. This drum is rotatably supported by two rollers 11, of which only one is visible in the represented section. The drum is partly filled with liquid of which 12 denotes the surface. The arrow 13 indicates the direction of rotation of the drum.

Connecting threaded hollow plug portions 14 and 15 communicating with the interior of the drum are secured in the wall 10 of the drum at two different points of its circumference. By means of a cap nut a filter box 16 can be coupled with the said hollow threaded plugs in a liquid-tight manner, so that the interior of this filter communicates with the interior of the drum at two different points of its circumference. During rotation in the direction of the arrow 13 the connecting hollow plug portion 14 will be first to descend below the surface 12 of the liquid. Consequently a part of the liquid enters the filter box 16, through the aperture of this connecting plug 14. As the rotation progresses more liquid enters, passes the filter layers 17 in the filter box 16 and finally reaches the other end of the filter near the connecting plug portion 15. So long as the two connections 14 and 15 are below the surface 12 of the liquid practically no further movement of liquid will take place in the filter. If, however, the connecting plug portion 14 stands again above the surface 12 of the liquid, the surface of liquid in the filter will also descend, the liquid still available also traversing the filter material 17 and finally reaching again the liquid bath through the connecting plug portion 15. With the represented form of construction and the direction of rotation indicated, a quantity of liquid is steadily taken off at the right-hand side of the section, passed through the filter and, after having been cleaned, supplied again to the liquid bath at the left-hand side. This is repeated during every revolution of the drum, so that the whole liquid bath will have traversed the filter after some time.

By unscrewing the cap nuts on the connecting plug portions 14 and 15, the filter housing 16 which is mounted to the outer wall of the drum so as to be removable therefrom, can be easily removed for cleaning or for replacing the filter box. As shown in the drawing, the inlet and outlet aperture for the liquid may be located in the same cross-section of the drum. It is also possible to arrange these two apertures both in the direction of rotation and in an axial direction of the drum with respect to each other. This may be desirable if a definite liquid current flows in the drum itself, for instance due to the presence of a helical ridge in the drum.

Figure 2 is a section of a drum, in which only the filter is provided in a different way than in Figure 1. The remaining parts are the same and bear the same reference numerals. In this case the filter 21 is housed in a box-shaped envelope 18 which rests on the inner wall 10 and of which two opposite walls 19 and 20 are provided with large numbers of perforations. Moreover, these walls 19 and 20 form an angle with the direction of rotation 13 of the drum, so that the liquid within the drum is forced, as it were, through the aperture in the wall 19. This liquid traverses the filter material 21 and leaves the filter again through the perforated wall 20. The operation of this filter corresponds to that illustrated in Figure 1. However, the construction shown in Figure 2 has the advantage that no seals or closures are required, since the wall of the drum is not perforated. This may be of importance in conjunction with chemically active liquids. However, the filter cannot be replaced without opening the drum.

What I claim is:

1. Liquid bath apparatus comprising a rotatable drum-like member normally-closed to retain a quantity of liquid, a closed filter casing located at the periphery of said member and rotatable therewith, an outlet connection for the liquid connecting one end of the casing to the interior of the drum-like member, an inlet connection for the liquid connecting the other end of the filter casing to the interior of the member, and a filter element disposed in said filter casing between the inlet and outlet connections, said inlet and outlet connections being connected to the interior of the drum-like member at points spaced apart peripherally with the inlet connection ahead of the outlet connection in the direction of rotation of the drum-like member.

2. Liquid bath apparatus comprising a rotatable drum-like member normally-closed to retain a quantity of liquid, a closed filter casing secured to the outer surface of said member and rotatable therewith, an outlet connection for the liquid connecting one end of the casing to the interior of the drum-like member, an inlet connection for the liquid connecting the other end of the filter casing to the interior of the member, and a filter element disposed in said filter casing between the inlet and outlet connections, said inlet and outlet connections being connected to the interior of the drum-like member at points spaced apart peripherally with the inlet connection ahead of the outlet connection in the direction of rotation of the drum-like member.

3. Liquid bath apparatus comprising a rotatable drum-like member normally-closed to retain a quantity of liquid, a closed filter casing located within said member at the periphery thereof and rotatable therewith, said casing being provided with an outlet opening for the liquid connecting the interior of the casing to the interior of the drum-like member and an inlet opening connection for the liquid connecting the interior of the filter casing to the interior of the member, and a filter element disposed in said filter casing between the inlet and outlet openings, said inlet and outlet openings being connected at points spaced apart peripherally with the inlet opening ahead of the outlet opening in the direction of rotation of the drum-like member.

JOHANNES HOEKSTRA.

REFERENCES CITED

The following references are of record in the file of this patent:

UNITED STATES PATENTS

| Number | Name | Date |
| --- | --- | --- |
| 279,226 | Crocker | June 12, 1883 |
| 358,107 | Crocker | Feb. 22, 1887 |
| 513,536 | Scowden | Jan. 30, 1894 |
| 788,511 | Besseberg | May 2, 1905 |
| 1,801,662 | Crutcher et al. | Apr. 21, 1931 |
| 1,895,276 | Cole | Jan. 24, 1933 |

FOREIGN PATENTS

| Number | Country | Date |
| --- | --- | --- |
| 675,763 | France | Nov. 8, 1929 |